Patented July 9, 1940

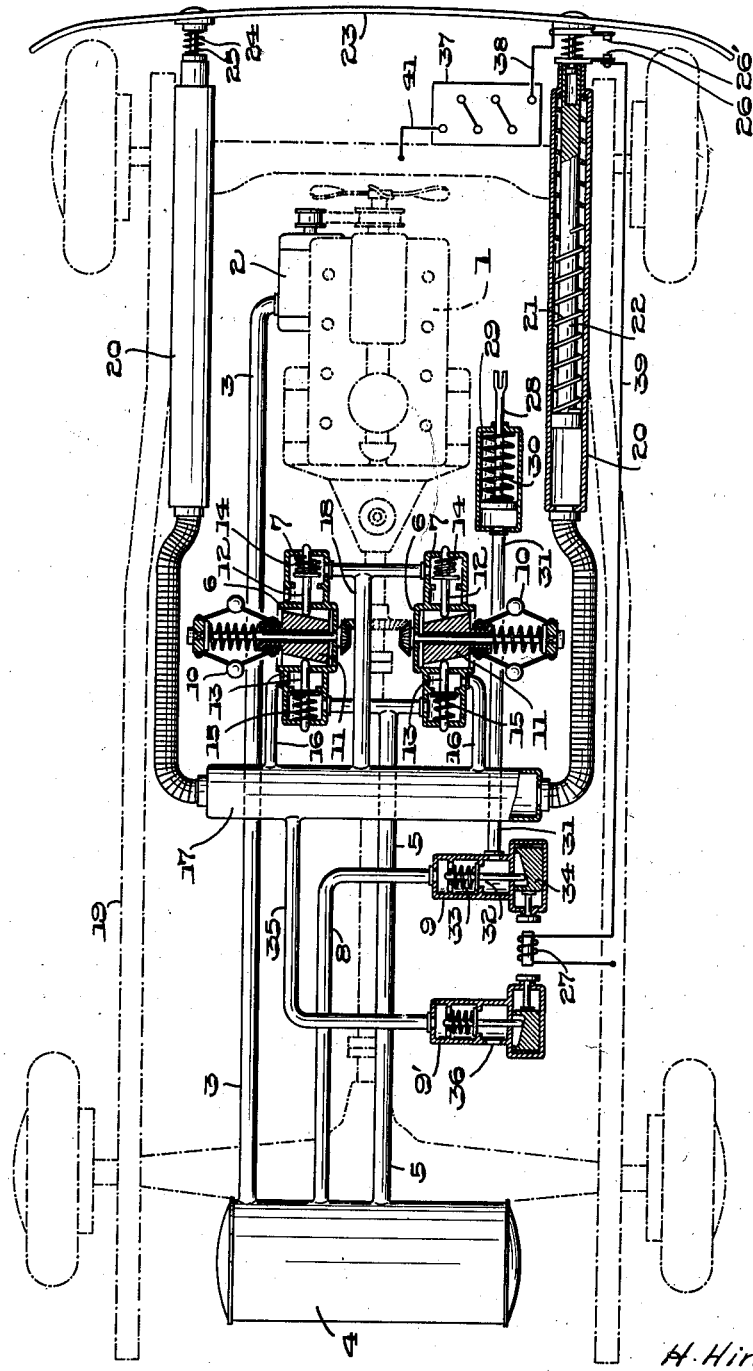

2,207,666

UNITED STATES PATENT OFFICE 2,207,666

AUTOMATIC STOP FOR AUTOMOBILES

Hirobumi Hirabayashi, Tokyo, Japan

Application November 14, 1938, Serial No. 240,421
In Japan March 10, 1938

2 Claims. (Cl. 180—83)

The present invention relates to an automatic stopping device for automobiles, and consists in providing a bumper or buffer beam which is resiliently mounted preferably on the front of an automobile, the buffer beam being extended outwardly according to the running speed of the automobile. This extension is effected by compressed air produced by a compressor which is operated by the engine of the car. The automatic stop is operated by the circuit of an electromagnet when the buffer beam is retracted by collision with some object, thus opening a passage for the compressed air which leads to the controlling piston of a brake lever. The object thereof is to obtain a simple device which not only prevents danger to the automobile by collision, but also protects the car from damage by applying the emergency brake automatically.

The accompanying drawing shows a plan of the automatic stop for automobiles according to the present invention.

In the drawing, 1 is the engine of an automobile and 2 is an air compressor operated by it. The air compressed by it is delivered to an air reservoir 4 through a pipe 3. The compressed air in the reservoir 4 is on the one hand supplied to the control valve chambers 7 of valve casings 6 by means of a pipe 5 and on the other hand to a valve casing 9 through a pipe 8. Each of the casings 6 is provided with a valve operator 11 which is moved up and down by the governors 10. Against the inclined surfaces of both sides of the valve operator the rods of an air feed valve 13 and exhaust valve 12 are pressed by springs 15 and 14 respectively. The above governor is driven by a suitable motion transmitting device from the driving mechanism of the car. When its speed is increased, each valve operator 11 opens the valve 13 to permit the compressed air from the pipe 5 to pass into the air tube 17 through a pipe 16, while when the above speed is reduced, the valve operator closes the valve 13 to cut off the supply of air. At the same time, the exhaust valve 12 is opened to discharge the air of the tube 17 into the atmosphere through a conduit 18. In this manner, said buffer beam is extended according to the running speed of the automobile.

At the forward part of the automobile a pair of cylinders 20 are arranged which communicate with the tube 17. Each of them contains a piston 22 which is normally pushed backward by a spring 21. At the end of the piston 22 a rod 24 is arranged which supports the buffer beam or bumper 23, in such a manner that it can be extended or retracted. Furthermore, the bumper is held by a spring 25 in a projected position with regard to the piston 22. The front end of the cylinder 20 and the back of the bumper 23 are provided with contacts 26 and 26' respectively which are in the circuit of an electro magnet 27.

28 is a piston rod connected with the brake lever of the car. The piston is normally pushed inwardly of the cylinder 29 by a spring 30. This cylinder communicates with the valve casing 9 by means of a pipe 31. A valve 32 in this casing is pushed by a spring 33, so that the valve rod is brought into contact with the inclined surface of a valve operator 34 which when attracted by the electro magnet 27, pushes the valve 32 open so that the compressed air passes into the cylinder 29. A valve casing 9' having substantially the same construction is disposed next to the casing 9, on the opposite side of the electro magnet 27. One side of the valve in the casing 9' communicates with the cylinder 17 through a pipe 35, while the other side communicates with the atmosphere through an opening 36.

In the present invention, when an automobile is running, the compressor 2 operates to store compressed air in the reservoir 4. When the running speed exceeds a certain limit, the governors 10 move the valve operators 11, whereby the air feed valves 13 are opened to fill the cylinder 17 with the compressed air through the pipes 5 and 16. Then the air enters the cylinders 20 and pushes the pistons 22 against the action of the springs 21 and consequently the bumper 23 is projected forwardly from the normal position, the degree of the projection depending on the speed of the car. Thus, when the bumper 23 comes into collision with some object during the running of the car, it retracts compressing the springs 25 and bringing the contacts 26 and 26' into contact with each other, thereby closing the complete circuit of the electro magnet 27, comprising a battery 37, a wire 38, contacts 26, 26' a wire 39, magnet 27, frame 19 and a wire 41, so that the said electro magnet is energized and attracts the valve operator 34. Consequently, the valve 32 is opened and the compressed air enters the cylinder 29 through the pipes 8 and 31 and pushes the cylinder therein moving the brake lever by the rod 28, thus stopping the car instantly. At the same time, the valve in the casing 9' is opened and the air of the cylinder 17 is discharged into the atmosphere so that each part returns to its original position.

With this apparatus, the bumper is projected in front of the body of the car and in case of collision is moved so as to automatically stop the car, whereby it is possible to prevent danger and protect the body and other parts of the car from damage.

What I claim is:

1. An automatic stop for vehicles comprising means for maintaining a source of compressed air, a bumper adjustably mounted at the front of the vehicle, means operable by compressed air for extending the bumper beyond its normal position, valve means controlling the amount of compressed air for extending the bumper, and means dependent on the speed of the vehicle for actuating said valve means whereby the bumper is extended in accordance with the speed of the vehicle.

2. An automatic stop for vehicles having brakes as claimed in claim 1 and further comprising means operable by compressed air for applying the brakes, valve means for controlling the compressed air for actuating the brake applying means, and means operable by said bumper when in retracted position for actuating said valve means whereby the brakes are automatically applied when the bumper is retracted.

HIROBUMI HIRABAYASHI.